(12) United States Patent
Sanchala et al.

(10) Patent No.: US 12,425,385 B2
(45) Date of Patent: Sep. 23, 2025

(54) METHOD AND SYSTEM FOR INTEGRATING APPLICATIONS ON SOFTWARE-AS-A-SERVICE PLATFORM USING SERVERLESS INTERFACE

(71) Applicant: JPMorgan Chase Bank, N.A., New York, NY (US)

(72) Inventors: Parita Sanchala, Mumbai (IN); Krishna Patel, Mumbai (IN); Nilesh Patil, Mumbai (IN); Sandip Musle, Ambernath (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 227 days.

(21) Appl. No.: 18/197,374

(22) Filed: May 15, 2023

(65) Prior Publication Data
US 2024/0333705 A1     Oct. 3, 2024

(30) Foreign Application Priority Data

Apr. 1, 2023   (IN) .............................. 202311025084

(51) Int. Cl.
*H04L 9/40*   (2022.01)
*G06F 9/54*   (2006.01)

(52) U.S. Cl.
CPC .......... *H04L 63/0807* (2013.01); *G06F 9/547* (2013.01); *H04L 63/0272* (2013.01); *H04L 63/029* (2013.01); *H04L 63/20* (2013.01)

(58) Field of Classification Search
CPC ...................... H04L 63/0807; H04L 63/0272; H04L 63/029
USPC ........................................................... 726/1
See application file for complete search history.

(56) References Cited

U.S. PATENT DOCUMENTS

| | | | |
|---|---|---|---|
| 2018/0270301 A1* | 9/2018 | Zhang | H04L 41/08 |
| 2020/0220875 A1* | 7/2020 | Harguindeguy | H04L 63/101 |
| 2020/0267155 A1* | 8/2020 | Segal | H04L 63/20 |
| 2021/0160162 A1* | 5/2021 | Abbas | H04L 43/0817 |

* cited by examiner

*Primary Examiner* — Anthony D Brown
(74) *Attorney, Agent, or Firm* — GREENBLUM & BERNSTEIN, P.L.C.

(57) ABSTRACT

A method and a system for integration of applications on a software-as-a-service-customer relationship management (SaaS-CRM) platform using a serverless interface are disclosed. The method comprises: (1) authenticating a user device application, by an authenticator, and generating an access token; (2) sending, by the user device application, request to an application programming interface (API) gateway to integrate the user device application with the SaaS-CRM platform, wherein the request includes the access token; (3) validating, by an authorizer, the access token to generate a policy; (4) granting access to the user device application for the serverless interface; (5) retrieving, by the serverless interface, a client credential data and a private key from a digital key manager; and (6) integrating, via the serverless interface, the user device application on the SaaS-CRM platform.

15 Claims, 4 Drawing Sheets

METHOD AND SYSTEM FOR INTEGRATING APPLICATIONS ON SOFTWARE-AS-A-SERVICE PLATFORM USING SERVERLESS INTERFACE

CROSS-REFERENCE TO RELATED APPLICATIONS

This application claims priority benefit from Indian Application No. 202311025084, filed on Apr. 1, 2023 in the India Patent Office, which is hereby incorporated by reference in its entirety.

BACKGROUND

Field of the Disclosure

This technology generally relates to methods and systems for integrating user device applications on software-as-a-service platforms, and more particularly to methods and systems for integrating the user device applications on software-as-a-service-customer relationship management (SaaS-CRM) platforms using a composite application programing interface (API).

Background Information

The following description of the related art is intended to provide background information pertaining to the field of the present disclosure. This section may include certain aspects of the art that may be related to various features of the present disclosure. However, it should be appreciated that this section is used only to enhance the understanding of the reader with respect to the present disclosure, and not as an admission of the prior art.

Typically, software-as-a-service-customer relationship management (SaaS-CRM) platforms are used by organizations in various domains for various activities relating to sales, servicing and marketing. These SaaS-CRM platforms may be used by the organizations in various fields that relate to a banking domain, in various line of businesses such as Consumer and Community Banking (CCB), Corporate and Investment Bank (CIB), Commercial Banking (CB), and Asset & Wealth Management (AWM), etc.

Initially, CRM solutions were hosted on a company's servers, which is an exorbitantly expensive approach. The SaaS-CRM platforms provide a cost-effective approach to using the CRM applications and that may be used entirely online as a service. These SaaS-CRM platforms are integrated with applications that may be used for various purposes such as for software development, data analysis, etc. apart from other internal applications in the organizations that may be used to provide services to end users via their user accounts. These internal applications may consume a number of application programming interfaces (APIs) to send data or receive data to or from the SaaS-CRM platforms.

For each internal application, a new user account on a SaaS-CRM platform is created which acts as an 'integration user' that would interact with SaaS-CRM platform APIs. For this purpose, the SaaS-CRM platforms charge huge costs to create user accounts, and a separate license may be required to perform various tasks on such SaaS-CRM platforms. In some cases, license cost may even extend to around $100 per user per month.

Further, for applications having use cases where they have to interact with multiple objects of the SaaS-CRM platform, they have to make multiple API calls to the SaaS-CRM platform. Also, in highly secure enterprise architectures such as those that relate to banking, etc., for implementing internal organization applications for providing services to their users, the Saas-CRM platforms may not be considered as safe, as the SaaS-CRM platforms are hosted on the Internet and fall outside the organizations' internal secured network, which may raise security concerns. Hence, efforts have been made to develop an interface to be hosted on an Internet-facing side that would interact with the SaaS-CRM platform and act as a proxy layer or interface between the internal organization applications and the SaaS-CRM platform. However, maintaining this proxy layer or interface may add further costs to the organization.

Accordingly, there exists a need to develop a common, cost-effective and scalable solution that may reduce the license cost of having multiple SaaS-CRM platform user licenses required by each consumer, enable accelerated onboarding of future consumers with less development effort, and reduce the number of API calls made by a consumer.

SUMMARY

The present disclosure, through one or more of its various aspects, embodiments, and/or specific features or sub-components, provides, inter alia, various systems, servers, devices, methods, media, programs, and platforms for integration of applications on a software-as-a-service-customer relationship management (SaaS-CRM) platform using a serverless interface.

According to an aspect of the present disclosure, a method for integrating an application on a software-as-a-service-customer relationship management (SaaS-CRM) platform using a serverless interface is disclosed. The method may include: authenticating a user device application, by an authenticator, to generate an authentication output; generating, by the authenticator, an access token in an event the authentication output of the user device application is a positive output; sending, by the user device application, a request to an application programming interface (API) gateway to integrate the user device application with the SaaS-CRM platform, wherein the request includes the access token; sending, by the API gateway, the access token to an authorizer; validating, by the authorizer, the access token received from the API gateway to generate a policy; evaluating, by the API gateway, the policy; granting access to the serverless interface, by the API gateway, to the user device application, based on the evaluation of the policy by the API gateway; retrieving, by the serverless interface, a client credential data and a private key from a digital key manager; and integrating, via the serverless interface, the user device application on the SaaS-CRM platform based on the client credential data and the private key.

In accordance with an exemplary embodiment, the sending the request to the application programming interface (API) gateway may include sending the request via a virtual private cloud (VPC) node.

In accordance with an exemplary embodiment, prior to the integrating the user device application on the SaaS-CRM platform, the serverless interface may further authenticate to SaaS-CRM platform using a JavaScript Object Notation (JSON) web token (JWT) authentication.

In accordance with an exemplary embodiment, the integrating the user device application on the SaaS-CRM platform may further include the serverless interface executing a composite application programming interface (API) at the SaaS-CRM platform.

In accordance with an exemplary embodiment, the user device application may be integrated on the SaaS-CRM platform via a private link and a proxy server.

According to another aspect of the present disclosure, a system configured to integrate an application on a software-as-a-service-customer relationship management (SaaS-CRM) platform using a serverless interface is provided. The system includes a processor, a memory, and a communication interface coupled to the processor and the memory. The serverless interface is configured to: retrieve a client credential data and a private key from a digital key manager; and enable integration of a user device application on the SaaS-CRM platform based on the client credential data and the private key. Also, prior to the retrieval of the client credential data and the private key from the digital key management unit via the serverless interface, the processor is configured to: (1) authenticate the user device application to generate an authentication output; (2) generate an access token in an event the authentication output of the user device application is a positive output; (3) cause the user device application to send a request to an application programming interface (API) gateway, to integrate the user device application with the SaaS-CRM platform, wherein the request includes the access token; (4) cause the API gateway to send the access token to an authorizer; (5) cause the authorizer to validate the access token received from the API gateway to generate a policy; (6) cause the API gateway to evaluate the policy; and (7) cause the API gateway to grant access to the serverless interface to the user device application, based on the evaluation of the policy by the API gateway.

In accordance with an exemplary embodiment, the request may be sent via a virtual private cloud (VPC) node.

In accordance with an exemplary embodiment, prior to the integration of the user device application on the SaaS-CRM platform, the serverless interface may be further configured to authenticate to the SaaS-CRM platform using a JSON web token (JWT) authentication.

In accordance with an exemplary embodiment, to integrate the user device application on the SaaS-CRM platform the serverless interface may be further configured to execute a Composite application programming interface (API) at the SaaS-CRM platform.

In accordance with an exemplary embodiment, the user device application may be integrated on the SaaS-CRM platform via a private link and a proxy server.

According to yet another aspect of the present disclosure, a non-transitory computer readable storage medium storing instructions for integrating an application on a software-as-a-service-customer relationship management (SaaS-CRM) platform using a serverless interface, is disclosed. The instructions include executable code which, when executed by a processor, may cause the processor to enable the serverless interface to: retrieve a client credential data and a private key from a digital key manager; and enable integration of a user device application on the SaaS-CRM platform based on the client credential data and the private key. Also, prior to the retrieval of the client credential data and the private key from the digital key manager, the executable code, when executed by the processor, may cause the processor to: (1) enable an authenticator to authenticate the user device application, to generate an authentication output; (2) enable the authenticator to generate an access token in an event the authentication output of the user device application is a positive output; (3) enable the user device application to send a request to an application programming interface (API) gateway, to integrate the user device application with the SaaS-CRM platform, wherein the request includes the access token; (4) enable the API gateway to send the access token to an authorizer; (5) enable the authorizer to validate the access token received from the API gateway to generate a policy; (6) enable the API gateway to evaluate the policy; and (7) enable the API gateway to grant access to the serverless interface to the user device application, based on the evaluation of the policy by the API gateway.

In accordance with an exemplary embodiment, the request may be sent via a virtual private cloud (VPC) node.

In accordance with an exemplary embodiment, prior to the integration of the user device application on the SaaS-CRM platform, when executed by the processor, the executable code may further cause the processor to: enable the serverless interface to authenticate to the SaaS-CRM platform using a JSON web token (JWT) authentication.

In accordance with an exemplary embodiment, to integrate the user device application on the SaaS-CRM platform, when executed by the processor, the executable code may further cause the processor to: enable the serverless interface execute a Composite application programming interface (API) at the SaaS-CRM platform.

In accordance with an exemplary embodiment, the user device application may be integrated on the SaaS-CRM platform via a private link and a proxy server.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

DETAILED DESCRIPTION

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controller described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

To overcome problems associated with integration of an application on a software-as-a-service-customer relationship management (SaaS-CRM) platform, for cost and performance optimization, the present disclosure provides a method and a system including a serverless interface on a public cloud-based space that is able to access an application using a composite application programming interface (API) on the SaaS-CRM platform. The composite API has the ability to execute a series of REST API requests in a single call. Thus, an entire series of requests counts as a single call towards API limits. The composite API is hosted on the public cloud using a public cloud API gateway and an authorizer. The authorizer connects to the SaaS-CRM platform using a single user account on the SaaS-CRM platform. In addition, a JavaScript Object Notation (JSON) web token authentication is used to connect to the SaaS-CRM platform. An API endpoint on the API gateway is protected using an authentication unit.

Figure 2:
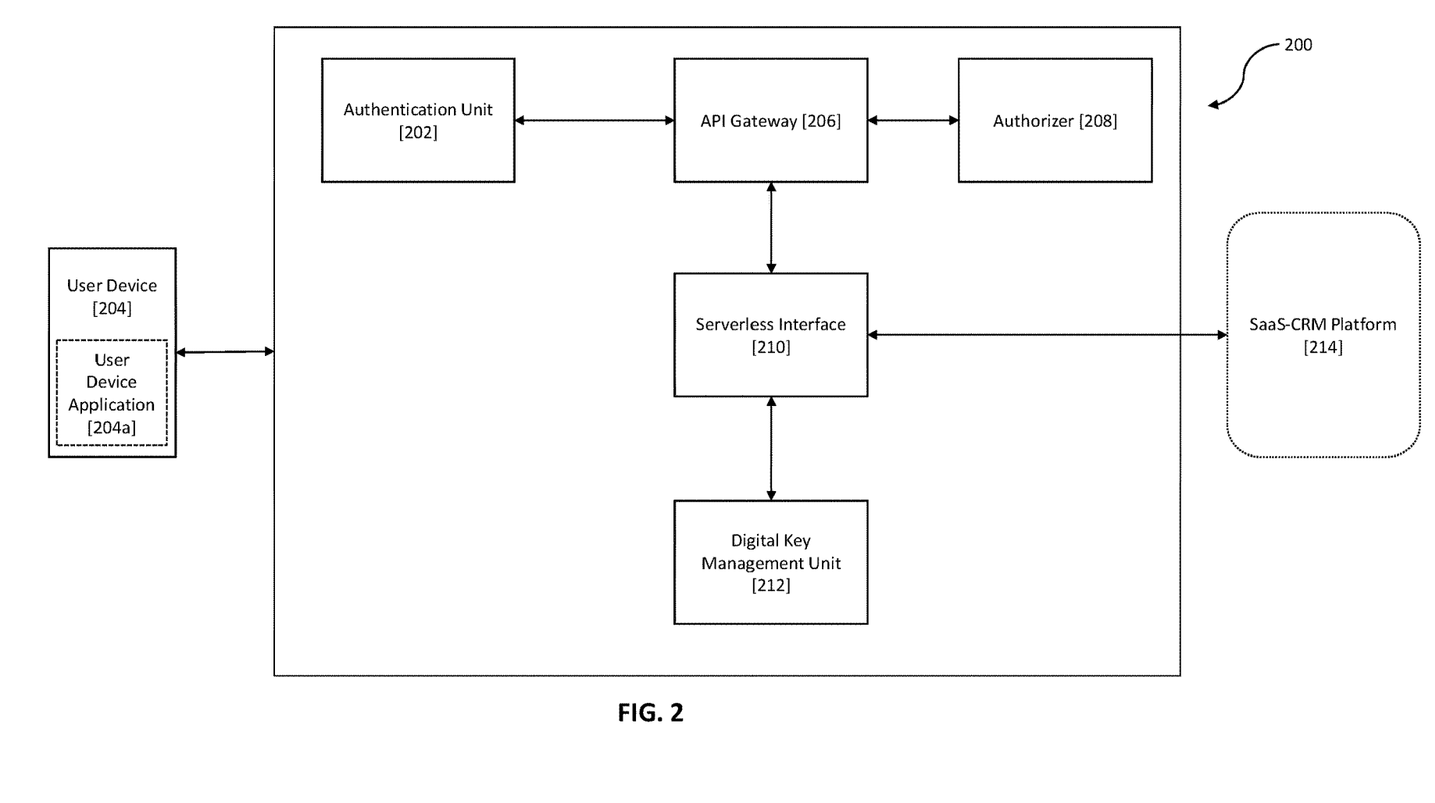
FIG. 2 illustrates an exemplary system 200 for integration of an application on a software-as-a-service-customer relationship management (SaaS-CRM) platform using a serverless interface, in accordance with an exemplary embodiment of the present disclosure.
Figure 4:
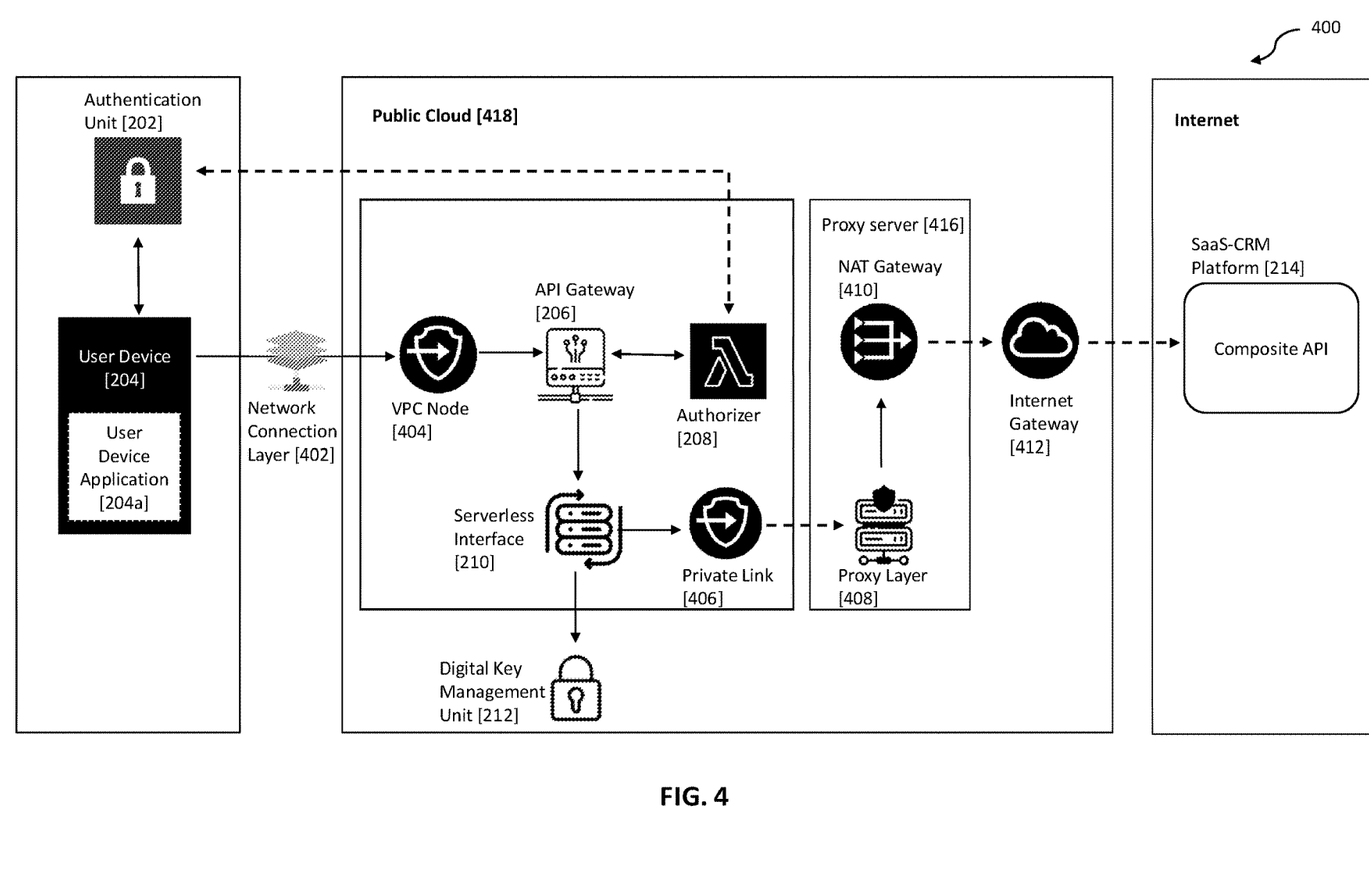
FIG. 4 is an exemplary architectural flow diagram 400 for implementing a method for integration of an application on a software-as-a-service-customer relationship management (SaaS-CRM) platform using a serverless interface, in accordance with an exemplary embodiment of the present disclosure.

FIG. 2 is an exemplary system 200 for use in accordance with the embodiments described herein. As shown, the system 200 includes at least an authentication unit 202 (also referred to herein as an "authenticator"), a user device 204 which includes a user device application 204a, an API gateway 206, an authorizer 208, and a serverless interface 210. The authenticator may be embodied as a processor, such as, for example, a microprocessor. The serverless interface 210 is connected to a software-as-a-service-customer relationship management (SaaS-CRM) platform 214 for providing an interface between the user device application 204a and the SaaS-CRM platform 214, all components of the system 200 are connected to each other unless otherwise indicated in this disclosure. FIG. 4 is an exemplary architectural flow diagram 400 for implementing a method for integration of an application on the software-as-a-service-customer relationship management (SaaS-CRM) platform using the serverless interface, in accordance with an exemplary embodiment of the present disclosure. For the purpose of clarity in explanation, FIG. 2 and FIG. 4 may be used in conjunction with each other in this disclosure.

Figure 1:
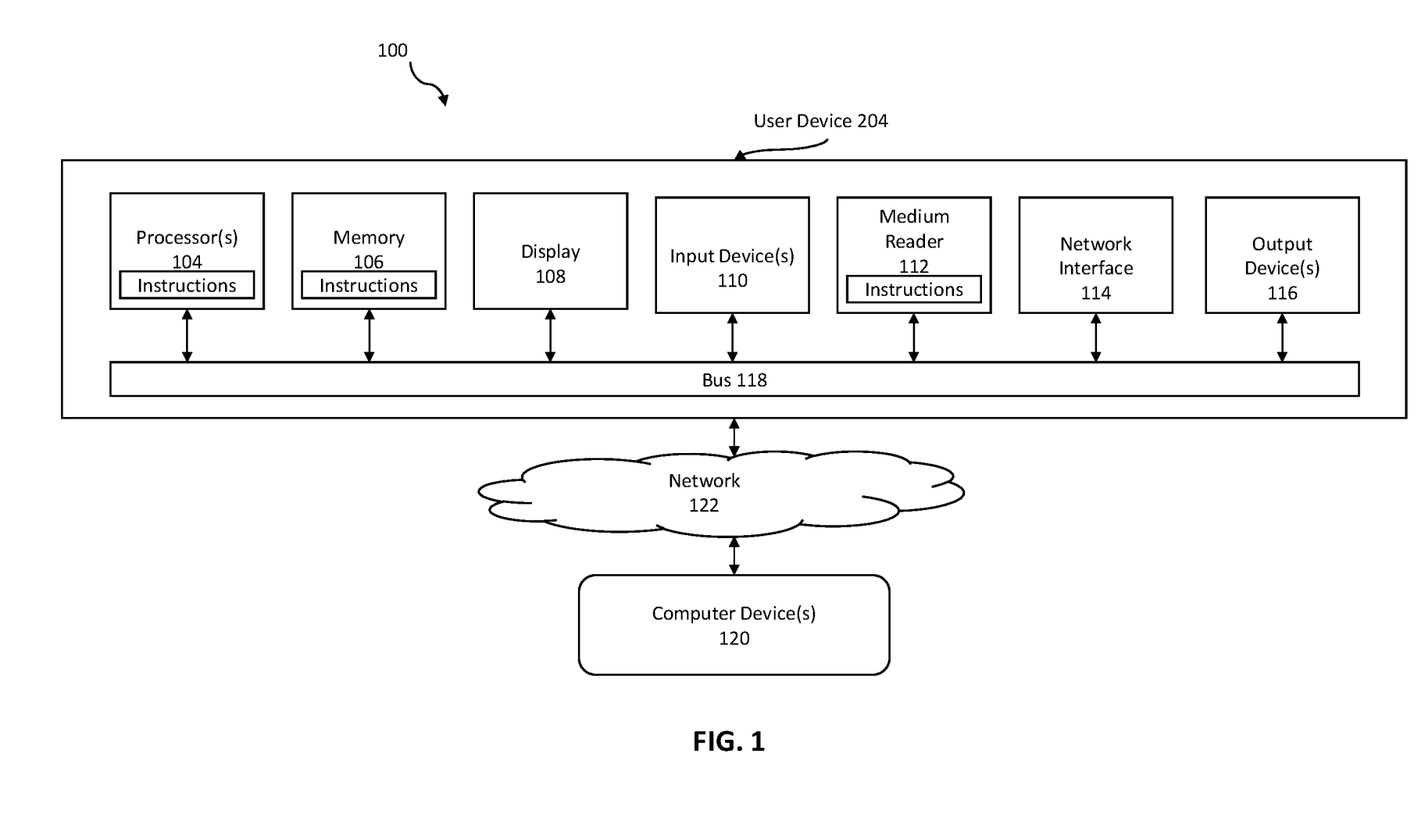
FIG. 1 illustrates an exemplary user device as part of a system 100 for integration of an application on a software-as-a-service-customer relationship management (SaaS-CRM) platform using a serverless interface, in accordance with an exemplary embodiment of the present disclosure.

The user device 204 may include a set of instructions or the user device application 204a that may be executed to cause the user device 204 to perform one or more of methods or computer-based functions disclosed herein, either alone or in combination with the other described devices. These instructions may be stored in a memory unit 106 (also referred to herein as a "memory") which may form a part of the user device 204 as shown in FIG. 1. The user device 204 may operate as a standalone device or may be connected to other systems or peripheral devices. For example, the user device 204 may include, or be included within, any one or more computers, servers, systems, and/or communication networks.

In a networked deployment, the user device 204 may operate in the capacity of a server or as a client user computer in a server-client user network environment, a client user computer in a cloud-based computing environment, or as a peer computer system in a peer-to-peer (or distributed) network environment. The user device 204, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single user device 204 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, a "cloud-based computing environment" or a "cloud space" or a "cloud" refers to a network architecture (for example, a virtualized information processing environment comprising hardware and software) through which various services are provided to the consumers. A cloud can include any number of virtual machines and other assets, and, an application or service can operate within, and interface with, multiple cloud-based computing environments. In general, a cloud can be a public cloud (for example, cloud services provided publicly to cloud service consumers) or a private cloud (for example, a private network or data center that supplies cloud services to only a specified group of cloud service consumers within an enterprise), or a community cloud (for example, a set of cloud services provided publicly to a limited set of cloud service consumers such as, to agencies with a specific State and/or Region or set of States and/or Regions), dedicated and/or hosted private cloud, or other models.

As illustrated in FIG. 1, the user device 204 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The user device 204 may also include the memory 106. The memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable storage mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. As regards the present invention, the user device memory may comprise any combination of memories or a single storage.

The user device 204 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The user device 204 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the user device 204 may include multiple input devices. Moreover, those skilled in the art further appreciate that the above-listed, exemplary input devices are not meant to be exhaustive and that the user device 204 may include any additional, or alternative, input devices.

The user device 204 may also include a medium reader 112 which is configured to read any one or more sets of instructions, for example, software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the user device 204.

Furthermore, the user device 204 may include any additional devices, components, parts, peripherals, hardware, software or any combination thereof which are commonly known and understood as being included with or within a computer system, such as, but is not limited to, a network interface 114 and an output device 116. The output device 116 may be, but is not limited to, a speaker, an audio out, a video out, a remote-control output, a printer, or any combination thereof.

Each of the components of the user device 204 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but is not limited to, peripheral component interconnect, peripheral component interconnect express, parallel advanced technology attachment, serial advanced technology attachment, etc.

The user device 204 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer ('PC'). However, those skilled in the art appreciate that, in alternative embodiments of the present application, the computer device 120 may be a virtual machine hosted on a cloud-based network, laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the user device 204. Furthermore, those skilled in the art similarly understand that the device may be any combination of devices and apparatuses.

Of course, those skilled in the art appreciate that the above-listed components of the user device 204 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations include can distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for integration of an application on a software-as-a-service-customer relationship management (SaaS-CRM) platform using a serverless interface in accordance with an exemplary embodiment.

Referring to FIG. 2, upon receiving a request to integrate an application programming interface (API) with the SaaS-CRM platform 214 that implements a feature of calling composite API requests, the authentication unit 202 is configured to authenticate the user device application 204a to generate an authentication output. For this purpose, the authentication unit 202 may use any existing third-party system. Also, the feature of calling composite API requests refers to a design approach to batch multiple API requests into a single API call as generally known in the art. Also, with reference to the present disclosure, the SaaS-CRM platform 214 may also be a third-party platform that may be used for sales management, leads management, tracking of leads converting the leads into opportunities, and further providing services to users that relate to various internal-organization-applications. Also, the system 200 may be used for on-boarding of customers, which may perform tasks that relates to know your customer (KYC) process, and other formalities to on-board the customers. Thus, an information is passed from the SaaS-CRM platform 214 to the system 200 via an integration. Also, the system 200 may be configured to send some data or information to the SaaS-CRM platform 214. This passing of information is an example of one type of "integration". In order to set the integration, an integration user account at the SaaS-CRM platform 214 is needed. Also, creating each integration user account for a customer costs a considerable amount to the customer.

In another example, a user may need to retrieve details of a customer from a system that is used to maintain records of the customers that relate to a company, or any other company-related information. For example, the customer here may be a restaurant chain and the information of the customer is registered in the system that is used to maintain the records (say, a records maintenance system). Further, the customer now needs to open another restaurant branch in some other geographic location. Now, the user of the system 200 may need to link a new account of the customer to an existing account of the customer present in the records maintenance system. In this case, the user of the system 200 may need to retrieve that information of the customer from the records maintenance system. This retrieval of information of the customer from the records maintenance system may also be referred to an 'integration'.

In another example, a customer wants the user to retrieve some tax document from the SaaS-CRM platform 214. In that case, the user may call using a communication means such as a telephone and may place an order for retrieving the required tax document using an interactive voice response (IVR) system connected to the SaaS-CRM platform 214. Here, the IVR system is integrated with the SaaS-CRM platform 214 which may create a case under user's account, and thereafter the tax document is emailed to the user by an agent of the SaaS-CRM platform 214.

Further, the authentication unit 202 is configured to generate an access token in an event the authentication output of the user device application 204a is a positive output. This means that the user device application 204a which is requested the system to integrate the API is an authenticated application of the user and may be allowed to integrate the required API with the SaaS-CRM platform 214. In an exemplary implementation, the user of this disclosure may be a company that delivers services to its customers and maintains user accounts of its customers. In that case, in this exemplary implementation, the user device may be in possession of the customer of the user (company), and not in possession of the user (company), e.g., the user is a company and the customer is a client of the company. The customer may want to integrate the API for retrieving or sending data from or to the SaaS-CRM platform 214. Here, the API may be protected using the authentication unit 202 and a resource is onboarded via a portal associated with the authentication unit 202. In an exemplary implementation, for this purpose of generating an access token, the customer may obtain a client ID against the resource. Using the client ID and credentials, the customer may get the access token via the authentication unit 202.

Further, the user device application 204a may send a request to the application programming interface (API) gateway 206, to integrate the user device application 204a with the SaaS-CRM platform 214, wherein the request includes the access token. This access token may be used by the API gateway 206 or other components of the system, or by both the API gateway 206 and the other components, to verify that the user device application 204a is the authenticated application. If the user device application 204a is the authenticated application, it may be allowed to integrate the requested API to the SaaS-CRM platform 214, after which the user device application 204a may send data to or receive data from the SaaS-CRM platform 214. In an exemplary implementation, this request to the API gateway 206, to integrate the user device application with the SaaS-CRM platform 214 may be sent via a virtual private cloud (VPC) node (as shown in FIG. 4).

Also, the authentication unit 202 as mentioned above may act as a passthrough and does not use a separate microservice for authentication purposes. Thus, on the API gateway side, the API may be protected by the authentication unit 202 and the user may create a resource on the authentication unit 202 to be used for this API. In addition, consumers who want to consume may on-board to the resource as clients on to the authentication unit 202. In this manner, the API may be protected by the authentication unit 202 which may provide the consumers a single sign-on (SSO) authorization service, such as an Active Directory Federation Service (ADFS) authentication as generally known in the art.

Thus, the API gateway 206 sends the access token to an authorizer 208. The authorizer 208 validates the access token received from the API gateway 206 to generate a policy. For example, this policy may be an Identity and Access Management (IAM) Policy, as generally known in the art, that defines permissions for an action regardless of a method that is used to perform an operation. In an exemplary implementation, systems may be deployed at a user location, provided by a third-party vendor through a cloud-based subscription model or may be deployed at a separate location. In an exemplary implementation, the authorizer 208 uses a lambda function (as shown in FIG. 4), as generally known in the art, for performing validation of the access token received. Also, in an exemplary implementation, as shown in FIG. 4, the authorizer 208 is also connected with the authentication unit 202 and the API gateway 206 that is further connected to the serverless interface 210.

Further, the API gateway 206 evaluates the policy. In addition, on the basis of this evaluation, the API gateway 206 allows or rejects an access to the user device application 204a for the serverless interface 210 based on the evaluation of the policy by the API gateway 206. That is, if the policy allows for granting access to the serverless interface 210, then the API gateway 206 allows access; otherwise, it rejects the access to the serverless interface 210.

In case the policy allows the user device application 204a to access the serverless interface 210, the serverless interface 210 is configured to retrieve a client credential data and a private key from a digital key management unit 212 (also referred to herein as a "digital key manager"). In such case, the serverless interface 210 connects to the SaaS-CRM platform 214 and acts as an interface between the user device application 204a and the SaaS-CRM platform 214. Advantageously, due to this feature, the user has to connect to the SaaS-CRM platform 214 only once and thus, a number of licenses to be procured are reduced. Further, this serverless interface is also responsible to leverage the composite API feature that may be available with the SaaS-CRM platform 214. As generally known in the art, the composite API may make multiple API calls in a single request. Thus advantageously, this may not only increase performance, but also contribute to other issues that relate to internet security such as Denial-of-Service (DOS) attacks that can pile up a server with unlimited API requests. Also, this may also help in handling larger amount of traffic and reduce a service time lag in such cases.

Also, the serverless interface 210 is configured to grant different permission sets against each user account. That means a separate permission set may be issued for each customer of the user. Also, in an exemplary implementation, the authorizer 208 may check with the authentication unit 202 whether the access token is valid. Thus, in this exemplary implementation, both the authentication unit 202 and the authorizer 208 check and verify if the access token is correct. Here, one may be seen as an issuer and the other as an assurer that the access token is correct.

Finally, the user device application 204a is integrated on the SaaS-CRM platform 214 via the serverless interface 210 based on the client credential data and the private key. In an exemplary implementation, the user device application 204a, is integrated on the SaaS-CRM platform 214 via a private link 406 (as shown in FIG. 4) and a proxy server 416 (as shown in FIG. 4). Also, for this purpose of integrating the user device application 204a on the SaaS-CRM platform 214, the serverless interface 210 is configured to execute the composite API at the SaaS-CRM platform 214. This composite API may include a sequence of APIs to be called. For example, a Representational State Transfer (REST) or RESTful API, as generally known in the art, for say, getting data from the SaaS-CRM platform 214 or posting data to the SaaS-CRM platform 214 may be a part of this composite API. In an exemplary implementation, prior to enabling integration of the user device application on the SaaS-CRM platform 214, the serverless interface 210 is configured to authenticate to SaaS-CRM platform 214 using a JSON web token (JWT) authentication. Further, in an exemplary implementation, the serverless interface 210 connects with the SaaS-CRM platform 214 using the proxy server 416 (as shown in FIG. 4). This proxy server 416 may be hosted by the serverless interface itself or may be hosted by a third-party for additional security purposes. Further, the digital key management unit 212 that is used to store the client credential data and the private key may also form a part of this third-party proxy server. Further, in an exemplary implementation as shown in FIG. 4, this integration is done via the private link 406, a network address translation (NAT) gateway 410 and an internet gateway 412.

Overall, the user or the customer of the user, e.g., the one that needs to be onboarded with the SaaS-CRM platform 214 now does not need to make a different user account with the SaaS-CRM platform 214 in order to access the SaaS-CRM platform for calling an API. The user may now access the API gateway 206 and connect to the SaaS-CRM platform 214.

Although the exemplary system 200 and its components are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Referring to FIG. 4, which illustrates an exemplary architectural flow diagram 400 for implementing a method for integration of an application on a software-as-a-service-customer relationship management (SaaS-CRM) platform using a serverless interface, in accordance with an exemplary embodiment. As shown, in FIG. 4 the user device 204 or a client device 204 is connected with a public cloud 418 via a network connection layer 402. In an exemplary implementation, a request for authentication by the user device application 204a originally goes to the API gateway 206 (via a VPC node 404) and the authentication unit 202. Also, as also explained elsewhere in this disclosure, an authorization, say a first level of authorization, happens on the API gateway 206 which then sends access token to the authorizer 208 after the first level of authorization. Also, as shown, the authorizer 208 is also connected with the authentication unit 202 and a public cloud gateway or the API gateway 206 that is further connected to the serverless interface 210. Further, the access token received from the API gateway 206 is validated by the authorizer 208, as a second level of authorization, to generate a policy. Also, this authorizer 208 communicates with the API gateway 206 to grant access to the user device application 204a for the serverless interface 210 based on the evaluation of the policy by the API gateway 206. Further, the serverless interface 210 retrieves a client credential data and a private key from a from the digital key management unit 212. The user device application 204a, as also explained above in this disclosure, is integrated on the SaaS-CRM platform 214 via the private link 406 and the proxy server 416, where the proxy server 416 includes a proxy layer 408. The private link 406 and the proxy layer 408 add additional level of security layer in integration of the user device application 204a at the SaaS-CRM platform 214 via internet. Thus, the application 204a is integrated with the SaaS-CRM platform 214 via the network address translation (NAT) gateway 410 and the internet gateway 412, where the NAT gateway 410 forms a part of the proxy server 416.

Figure 3:
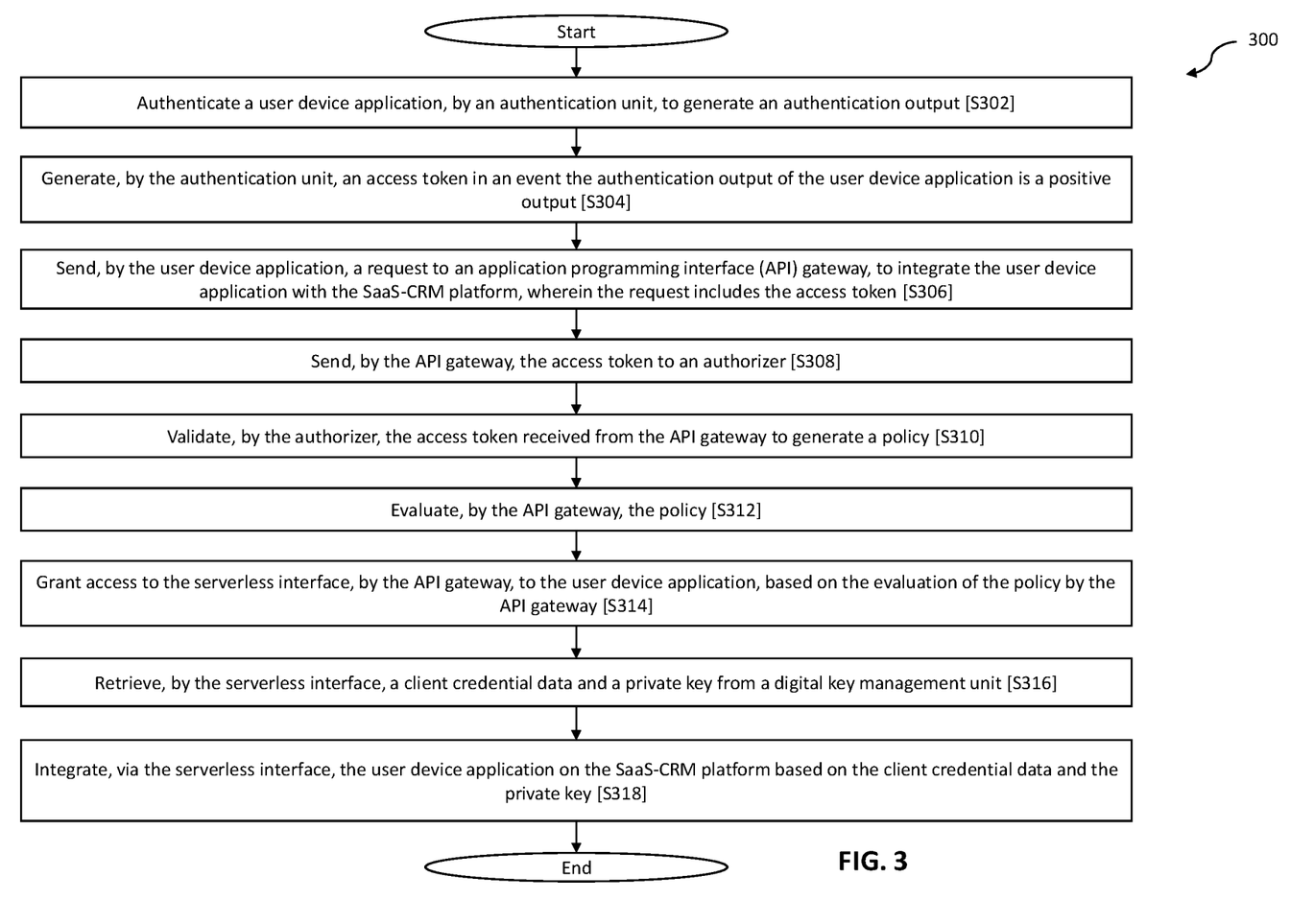
FIG. 3 is a flowchart of an exemplary process for implementing a method 300 for integration of an application on a software-as-a-service-customer relationship management (SaaS-CRM) platform using a serverless interface, in accordance with an exemplary embodiment of the present disclosure.

Referring to FIG. 3, an exemplary method 300 is shown for integration of an application on a software-as-a-service-customer relationship management (CRM) platform using a serverless interface, in accordance with exemplary embodiment of the present disclosure. As shown in FIG. 3, the method begins at step S302 upon receiving a request to integrate an application programming interface (API) with the SaaS-CRM platform 214 that implements a feature of calling composite API requests. At step S302, an authentication unit 202 authenticates a user device application 204a to generate an authentication output. For this purpose, the authentication unit 202 may make use of any existing third-party system. Also, the feature of calling composite API requests refers to a design approach to batch multiple API requests into a single API call, as generally known in the art. Also, with reference to the present disclosure, the SaaS-CRM platform 214 may also be a third-party platform that may be used for sales management, leads management, tracking of leads, and converting them into opportunities, and providing services to users that relate to various internal-organization-applications. Also, a system 200 may be used for on-boarding of customers and may perform tasks that relates to the KYC process and such other formalities that may be performed to on-board the customers. Thus, information is passed from the SaaS-CRM platform 214 to the system 200 via an integration. Also, the system 200 may be configured to send some data or information to the SaaS-CRM platform 214. This passing of information is an example of one type of "integration". In order to set the integration, an integration user account at the SaaS-CRM platform 214 is needed. Also, each user account when created for a customer, costs a considerable amount of money to the customer.

In another example, a user may need to retrieve details of a customer from a records maintenance system that is used to maintain records of the customers that relate to a company or any other company related information.

Further, at step S304, the authentication unit 202 generates an access token in an event the authentication output of the user device application 204a is a positive output. This means that the user device application 204a which is requested the system to integrate the API is an authenticated application of the user and may be allowed to integrate the required API with the SaaS-CRM platform 214. In an exemplary implementation, the user of this disclosure may be a company that delivers services to its customers and maintains user accounts of its customers. In that case, in this exemplary implementation, the user device may be in possession of the customer of the user (company) and not in possession of the user (company) e.g., the user is a company and the customer is a client of the company. The customer may want to integrate the API for retrieving a data from or for sending a data to the SaaS-CRM platform 214. Here, the API may be protected using the authentication unit 202 and a resource is onboarded via a portal associated with the authentication unit 202. In an exemplary implementation, for this purpose of generating an access token, the customer may obtain a client ID against the resource. Using the client ID and credentials, the customer may get the access token via the authentication unit 202.

Further, at step S306, the user device sends a request to the application programming interface (API) gateway 206, to integrate the user device application 204a with the SaaS-CRM platform 214, wherein the request includes the access token. This access token may be used by the API gateway 206 or other components of the system, or by both the API gateway 206 and the other components, to verify that the user device application 204a is the authenticated application and therefore may be allowed to integrate the requested API to the SaaS-CRM platform 214, after which the user device application 204a may send data to or receive data from the SaaS-CRM platform 214. In an exemplary implementation, this request to the application programming interface (API) gateway 206, to integrate the user device application 204a with the SaaS-CRM platform 214 may be sent via a virtual private cloud (VPC) node (as shown in FIG. 4).

Also, the authentication unit 202 as mentioned above may act as a passthrough and does not use a separate microservice for authentication purposes. Thus, on the API gateway side, the API may be protected by the authentication unit 202 and the user may create a resource on the authentication unit 202 to be used for this API. And consumers who want to consume may on-board to the resource as clients on to the authentication unit 202. In this manner, the API may be protected by the authentication unit 202 which may provide the consumers a single sign-on (SSO) authorization service, such as an Active Directory Federation Service (ADFS) authentication as generally known in the art.

Thus, at step S308, the API gateway 206 sends the access token to an authorizer 208. The authorizer 208, at step S310, validates the access token received from the API gateway 206 to generate a policy. For example, this policy may be an Identity and Access Management (IAM) Policy, as generally known in the art, that defines permissions for an action regardless of a method that is used to perform an operation. In an exemplary implementation, systems may be deployed at a user location, provided by a third-party vendor through a cloud-based subscription model or may be deployed at a separate location. In an exemplary implementation, the authorizer 208 uses a lambda function (as shown in FIG. 4), as generally known in the art, for performing validation of the access token received. Also, in an exemplary implementation, as shown in FIG. 4, the authorizer 208 is also connected with the authentication unit 202 and a public cloud gateway or the API gateway 206 that is further connected to the serverless interface 210.

Further, at step S312, the API gateway 206 evaluates the policy. Also, on the basis of this evaluation, the API gateway 206 allows or rejects an access to the user device application 204*a* for the serverless interface 210 based on the evaluation of the policy by the API gateway 206. That is, if the policy allows for granting access to the serverless interface 210, then the API gateway 206 allows access to the user device application 204*a* for the serverless interface 210 at step S314. Otherwise, it rejects the access to the serverless interface 210 at this step and the process may end here.

Further, in case the policy allows the user device application 204*a* to access the serverless interface 210, and the API gateway 206 has granted access to the user device application 204*a* for the serverless interface 210 at step S314, the serverless interface 210 is configured to retrieve a client credential data and a private key from a digital key management unit 212 at step S316. In such case, the serverless interface 210 connects to the SaaS-CRM platform 214 and acts as an interface between the user device application 204*a* and the SaaS-CRM platform 214. Advantageously, due to this feature, the user has to connect to the SaaS-CRM platform 214 only once and thus, a number of licenses to be procured are reduced. Further, this server less interface is also responsible to leverage the composite API feature that may be available with the SaaS-CRM platform 214. As generally known in the art, the composite API may make multiple API calls in a single request. Thus advantageously, this may not only increase performance, but also contribute to other issues that relate to internet security such as Denial-of-Service (DOS) attacks that can pile up a server with unlimited API requests. Also, this may also help in handling larger amount of traffic and reduce the service time lag in such cases.

Also, the serverless interface 210 is configured to grant different permission sets against each user account. That means a separate permission set may be issued for each customer of the user. Also, in an exemplary implementation, the authorizer 208 may check with the authentication unit 202 whether the access token is valid. Thus, in this exemplary implementation, both the authentication unit 202 and the authorizer 208 check and verify if the access token is correct. Here, one may be seen as an issuer and the other as an assurer that the access token is correct.

Finally, at step S318, the user device application 204*a* is integrated on the SaaS-CRM platform 214 via the serverless interface 210 based on the client credential data and the private key, wherein the user device application 204*a* is integrated on the SaaS-CRM platform 214 via a private link 406 and a proxy server 416, where the proxy server 416 includes a proxy layer 408. Also, for this purpose of integrating the user device application 204*a* on the SaaS-CRM platform 214, the serverless interface 210 is configured to execute the composite application programming interface (API) at the SaaS-CRM platform 214. This composite API may include a sequence of APIs to be called. For example, a Representational State Transfer (REST) or RESTful API, as generally known in the art, for, say, getting data from the SaaS-CRM platform 214 or posting data to the SaaS-CRM platform 214 may be a part of this Composite API. In an exemplary implementation, prior to this enabling integration of the user device application 204*a* on the SaaS-CRM platform 214, the serverless interface 210 is configured to authenticate to SaaS-CRM platform 214 using a JSON web token (JWT) authentication. Further, in an exemplary implementation, the serverless interface 210 connects with the SaaS-CRM platform 214 using the proxy server 416 (as shown in FIG. 4). This proxy server 416 may be hosted by the serverless interface itself or may be hosted by a third-party for additional security purposes. Further, the digital key management unit 212 that is used to store the client credential data and the private key may also form a part of this third-party proxy server. Further, in an exemplary implementation as shown in FIG. 4, this integration is done via the private link 406, a network address translation (NAT) gateway 410 and an internet gateway 412.

Thus, by practicing and implementing the method and system as illustrated in the above discussion, a person skilled in the art would be able to obtain the serverless interface 210 on a public cloud-based space that is able to expose a composite API on the SaaS-CRM platform 214 for reading and/or writing data on the SaaS-CRM platform 214. Since a composite API has the ability to execute a series of REST API requests in a single call, the number of API calls made for a single purpose of the user would reduce significantly, thereby reducing cost to the user as well as increasing performance of the system. Further, building the solution on public cloud makes it use the feature of being serverless, so makes it scalable, and also adds cost benefits. This also saves a lot of development efforts and time by not making separate microservice for each API task. Also, if the same is implemented on a private cloud, a microservice application may have to be implemented which would run all the time. However, when the same is implemented on a public cloud 418, it works only when it is invoked by a user, otherwise it is dormant or sleeping. Thus, a lot of system resources are also saved by implementing the solution as explained above in this disclosure. Further, the composite API is hosted on the public cloud 418 using the API gateway 206 and the authorizer 208 which provide enhanced security for the user to connect to the SaaS-CRM platform 214 and execute internal applications on the SaaS-CRM platform 214 which would otherwise be under threat to various attacks that relate to internet security issues. The serverless interface 210 connects to the SaaS-CRM platform 214 using a single user account on the SaaS-CRM platform 214, thus reducing the number of user accounts needed to be created on the SaaS-CRM platform 214, thus reducing the costs incurred to the user.

Also, according to an aspect of the present disclosure, a non-transitory computer readable storage medium storing instructions for integrating an application on a software-as-a-service-customer relationship management (SaaS-CRM) platform using a serverless interface, is disclosed. The instructions include executable code which, when executed by a processor, may cause the processor to: enable the serverless interface to: retrieve a client credential data and a private key from a digital key management unit; and enable integration of a user device application on the SaaS-CRM platform based on the client credential data and the private key. Also, prior to the retrieval of the client credential data and the private key from the digital key management unit, the executable code, when executed by the processor, may cause the processor to: (1) enable an authentication unit to authenticate the user device application, to generate an authentication output; (2) enable the authentication unit to generate an access token in an event the authentication output of the user device application is a positive output; (3) enable the user device application to send a request to an application programming interface (API) gateway, to integrate the user device application with the SaaS-CRM platform, wherein the request includes the access token; (4) enable the API gateway to send the access token to an authorizer; (5) enable the authorizer to validate the access token received from the API gateway to generate a policy; (6) enable the API gateway to evaluate the policy; and (7) enable the API gateway to grant access to the serverless interface to the user device application, based on the evaluation of the policy by the API gateway.

In accordance with an exemplary embodiment, the request by the user device application to the application programming interface (API) gateway may be sent via a virtual private cloud (VPC) node.

In accordance with an exemplary embodiment, prior to the integration of the user device application on the SaaS-CRM platform, when executed by the processor, the executable code may further cause the processor to: enable the serverless interface to authenticate to the SaaS-CRM platform using a JSON web token (JWT) authentication.

In accordance with an exemplary embodiment, to integrate the user device application on the SaaS-CRM platform, when executed by the processor, the executable code may further cause the processor to: enable the serverless interface execute a composite application programming interface (API) at the SaaS-CRM platform.

In accordance with an exemplary embodiment, the user device application may be integrated on the SaaS-CRM platform via a private link and a proxy server.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable storage medium may be described as a single medium, the term "computer-readable storage medium" includes a single medium or multiple media, such as a centralized or distributed database, and/or associated caches and servers that store one or more sets of instructions. The term "computer-readable medium" and/or "computer-readable storage medium" shall also include any storage medium that is capable of storing, encoding or carrying a set of instructions for execution by a processor or that cause a computer system to perform any one or more of the embodiments disclosed herein.

The computer-readable storage medium may comprise a non-transitory computer-readable storage medium or media and/or comprise a transitory computer-readable storage medium or media. In a particular non-limiting, exemplary embodiment, the computer-readable storage medium can include a solid-state memory such as a memory card or other package that houses one or more non-volatile read-only memories. Further, the computer-readable storage medium can be a random-access memory or other volatile re-writable memory. Additionally, the computer-readable storage medium can include a magneto-optical or optical medium, such as a disk or tapes or other storage device to capture carrier wave signals such as a signal communicated over a transmission medium. Accordingly, the present disclosure is considered to include any computer-readable storage medium or other equivalents and successor media, in which data or instructions may be stored.

Although the present application describes specific embodiments which may be implemented as computer programs or code segments in computer-readable storage media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the present disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the present disclosure. Other embodiments may be utilized and derived from the present disclosure, such that structural and logical substitutions and changes may be made without departing from the scope of the present disclosure. Additionally, the illustrations are merely representational and may not be drawn to scale. Certain proportions within the illustrations may be exaggerated, while other proportions may be minimized. Accordingly, the present disclosure and the figures are to be regarded as illustrative rather than restrictive.

One or more embodiments of the present disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the present disclosure is submitted with the understanding that it will not be used to interpret or limit the scope or meaning of the claims. In addition, in the foregoing Detailed Description, various features may be grouped together or described in a single embodiment for the purpose of streamlining the present disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for integrating an application on a software-as-a-service-customer relationship management (SaaS-CRM) platform using a serverless interface, the method comprising:
   authenticating a user device application, by an authenticator, to generate an authentication output;
   generating, by the authenticator, an access token in an event the authentication output of the user device application is a positive output;
   sending, by the user device application, a request to an application programming interface (API) gateway, to integrate the user device application with the SaaS-CRM platform, wherein the request includes the access token;
   sending, by the API gateway, the access token to an authorizer;
   validating, by the authorizer, the access token received from the API gateway to generate a policy;
   evaluating, by the API gateway, the policy;
   granting access to the serverless interface, by the API gateway, to the user device application, based on the evaluation of the policy by the API gateway;
   retrieving, by the serverless interface, a client credential data and a private key from a digital key manager; and
   integrating, via the serverless interface, the user device application on the SaaS-CRM platform based on the client credential data and the private key.

2. The method as claimed in claim 1, wherein the sending the request to the application programming interface (API) gateway comprises:
   sending the request via a virtual private cloud (VPC) node.

3. The method as claimed in claim 1, wherein prior to the integrating the user device application on the SaaS-CRM platform, the serverless interface further authenticates to the SaaS-CRM platform using a JavaScript Object Notation (JSON) web token (JWT) authentication.

4. The method as claimed in claim 1, wherein the integrating the user device application on the SaaS-CRM platform further comprises:
   the serverless interface executing a composite application programming interface (API) at the SaaS-CRM platform.

5. The method as claimed in claim 1, wherein the user device application is integrated on the SaaS-CRM platform via a private link and a proxy server.

6. A system for integrating an application on a software-as-a-service-customer relationship management (SaaS-CRM) platform using a serverless interface, the system comprising:
   a processor;
   a memory; and
   a communication interface coupled to the processor and the memory,
   wherein the serverless interface is configured to:
      retrieve a client credential data and a private key from a digital key manager; and
      enable integration of a user device application on the SaaS-CRM platform based on the client credential data and the private key, and wherein:
      prior to the retrieval of the client credential data and the private key from the digital key manager via the serverless interface, the processor is configured to:
         authenticate the user device application to generate an authentication output;
         generate an access token in an event the authentication output of the user device application is a positive output;
         cause the user device application to send a request to an application programming interface (API) gateway, to integrate the user device application with the SaaS-CRM platform, wherein the request includes the access token;
         cause the API gateway to send the access token to an authorizer;
         cause the authorizer to validate the access token received from the API gateway to generate an policy;
         cause the API gateway to evaluate the policy; and
         cause the API gateway to grant access to the serverless interface to the user device application, based on the evaluation of the policy by the API gateway.

7. The system as claimed in claim 6, wherein the request is sent via a virtual private cloud (VPC) node.

8. The system as claimed in claim 6, wherein prior to the integration of the user device application on the SaaS-CRM platform, the serverless interface is further configured to authenticate to the SaaS-CRM platform using a JavaScript Object Notion (JSON) web token (JWT) authentication.

9. The system as claimed in claim 6, wherein to integrate the user device application on the SaaS-CRM platform, the serverless interface is further configured to:
   execute a composite application programming interface (API) at the SaaS-CRM platform.

10. The system as claimed in claim 6, wherein the user device application is integrated on the SaaS-CRM platform via a private link and a proxy server.

11. A non-transitory computer readable storage medium storing instructions for integrating an application on a software-as-a-service-customer relationship management (SaaS-CRM) platform using a serverless interface, the instructions comprising executable code which, when executed by a processor, causes the processor to:
    enable the serverless interface to:
        retrieve a client credential data and a private key from a digital key manager; and
        enable integration of a user device application on the SaaS-CRM platform based on the client credential data and the private key,
    wherein prior to the retrieval of the client credential data and the private key from the digital key manager, the executable code, when executed by the processor, causes the processor to:
        enable an authenticator to authenticate the user device application to generate an authentication output;
        enable the authenticator to generate an access token in an event the authentication output of the user device application is a positive output;
        enable the user device application to send a request to an application programming interface (API) gateway, to integrate the user device application with the SaaS-CRM platform, wherein the request includes the access token;
        enable the API gateway to send the access token to an authorizer;
        enable the authorizer to validate the access token received from the API gateway to generate a policy;
        enable the API gateway to evaluate the policy; and
        enable the API gateway to grant access to the serverless interface to the user device application, based on the evaluation of the policy by the API gateway.

12. The storage medium as claimed in claim 11, wherein the request is sent via a virtual private cloud (VPC) node.

13. The storage medium as claimed in claim 11, wherein prior to the integration of the user device application on the SaaS-CRM platform, when executed by the processor, the executable code further causes the processor to:
    enable the serverless interface to authenticate to the SaaS-CRM platform using a JavaScript Object Notation (JSON) web token (JWT) authentication.

14. The storage medium as claimed in claim 11, wherein to integrate the user device application on the SaaS-CRM platform, when executed by the processor, the executable code further causes the processor to:
    enable the serverless interface to execute a composite application programming interface (API) at the SaaS-CRM platform.

15. The storage medium as claimed in claim 11, wherein the user device application is integrated on the SaaS-CRM platform via a private link and a proxy server.

\* \* \* \* \*